(12) United States Patent
Bluzer

(10) Patent No.: US 7,253,412 B2
(45) Date of Patent: Aug. 7, 2007

(54) FOCAL PLANE ANTENNA TO SENSOR INTERFACE FOR AN ULTRA-SENSITIVE SILICON SENSOR

(75) Inventor: Nathan Bluzer, Rockville, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 56 days.

(21) Appl. No.: 11/239,275

(22) Filed: Sep. 30, 2005

(65) Prior Publication Data
US 2006/0076493 A1     Apr. 13, 2006

Related U.S. Application Data

(60) Provisional application No. 60/614,472, filed on Oct. 1, 2004.

(51) Int. Cl.
*G01J 5/00* (2006.01)
(52) U.S. Cl. .................................. 250/338.1
(58) Field of Classification Search ............. 250/338.1
See application file for complete search history.

(56) References Cited

U.S. PATENT DOCUMENTS

| | | | |
|---|---|---|---|
| 5,432,374 A | * | 7/1995 | Norton ................. 257/442 |
| 6,329,649 B1 | | 12/2001 | Jack et al. |
| 6,441,368 B1 | | 8/2002 | Grinberg et al. |
| 6,489,615 B2 | | 12/2002 | Bluzer |
| 2002/0117622 A1 | * | 8/2002 | Bluzer ................. 250/338.1 |

FOREIGN PATENT DOCUMENTS

WO      WO-WO 00/75688        12/2000

* cited by examiner

*Primary Examiner*—David Porta
*Assistant Examiner*—Marcus H Taningco
(74) *Attorney, Agent, or Firm*—Birch, Stewart, Kolasch & Birch, LLP (57) ABSTRACT

An electrical interface between a scene to be imaged and a bolometer type sensor is disclosed. Efficiency is improved by means of a thermal energy concentrator including a lens and an antenna. Where a plurality of bolometer pixels are located in an array, a microantenna is provided for each pixel in the array with a common lens being provided to focus and channel incoming radiation to each microantenna. Radiation from a scene is further coupled by means of a lens and microantenna to the absorbing element of each bolometer through an AC coupling circuit including an electronic chopper implemented by means of a PIN diode, the conductivity of which is varied so as to affect the reflection coefficient of the input signal supplied through the microantenna.

38 Claims, 6 Drawing Sheets

FOCAL PLANE ANTENNA TO SENSOR INTERFACE FOR AN ULTRA-SENSITIVE SILICON SENSOR

CLAIM OF PRIORITY

This application is a Non-provisional application including the subject matter and claiming the priority date Under 35 U.S.C. §119(e) of Provisional application Ser. No. 60/614,472, filed Oct. 1, 2004, the contents of which are meant to be incorporated herein by reference.

RELATED APPLICATIONS

This application is related to Non-provisional application Ser. No. 11/240,772, entitled "Sensitive Silicon Sensor And Test Structure For An Ultra-Sensitive Silicon Sensor" filed on Oct. 3, 2005, Non-provisional application Ser. No. 11/239,297, entitled "Ultra-Sensitive Silicon Sensor Readout Circuitry" filed on Sep. 30, 2005 now U.S. Pat. No. 7,157,708 B2 which issued on Jan. 2, 2007); and Non-provisional application Ser. No. 11/240,471 filed on Oct. 3, 2005, entitled "Low Noise Field Effect Transistor.

BACKGROUND OF THE INVENTION

1. Field of the Invention

This invention relates generally to bolometer type radiation sensors for detecting thermal radiation and more particularly to the interface circuitry between a silicon type bolometer sensor and the antenna means therefor.

2. Related Art

Bolometers are well known in the art and comprise devices which generate a voltage output when thermal radiation is absorbed. These devices have been successfully used for infra-red (IR) imaging in the long wave infra-red (LWIR) band of the electromagnetic spectrum. Extending these devices to other spectral bands has proven relatively difficult in the past. However, efforts are currently under way to extend this capability to millimeter wave to the (MM) and terrahertz (THz) spectral bands and thus there is a need for imagers operating in the MM and THz spectral bands. Applications for such devices include, for example, multi-spectral imaging for improved navigation, target recognition and detection as well as homeland defense applications. Such applications all require the use of bolometers. Therefore, realizing bolometers with acceptable performance with MM-THZ-LWIR cameras requires the formulation of new approaches for overcoming conventional limitations such as the requirement for faster response time and the ability to maintain sensitivity for relatively long periods A fast response time accordingly dictates minimizing the mass of the bolometer's absorbing element.

In related application Ser. No. 11/240,772 entitled "Sensitive Silicon Sensor and Test Structure For An Ultra-Sensitive Silicon Sensor", there is disclosed a sensor of thermal radiation comprised of a pair of silicon diodes connected in back-to-back relationship with one of the diodes being located in a detector stage, while the other diode is located in a heat bath stage along with a temperature difference amplifier. The detector stage is thermally isolated from the heat bath stage by a low thermal conductivity link which includes electrical wiring for connecting the back-to-back diodes.

In U.S. Pat. No. 7,157,708 entitled "Ultra-Sensitive Silicon Sensor Readout Circuitry", there is disclosed circuitry for providing cancellation of local threshold voltage variations and low frequency 1/f noise components in the pixel readout circuitry of an electro-thermal feedback loop including the heat generated by an amplifier circuit located an intermediate stage of a silicon sensor including a detector stage and a heat bath stage.

In U.S. Pat. No. 6,489,615, entitled, "Ultra-Sensitive Silicon Sensor" dated Dec. 3, 2002, there is shown a pair of back-to-back temperature sensing silicon diodes respectively located in a detector stage and an intermediate stage and coupled to a temperature difference amplifier also located in the intermediate stage. The intermediate stage is located between the detector stage and the heat bath stage, with the intermediate stage also including a electro-thermal feedback loop which is provided by the heat generated by an amplifier located in the intermediate stage which generates heat which is proportional to the temperature difference between the difference between the detected temperatures provided by the silicon diodes. The heat provided by the amplifier itself actively minimizes or zeroes the temperature difference between the detector and the intermediate stage so as to minimize or zero any net heat flow between the detector element and the intermediate stage.

SUMMARY

It is an object of the present invention to provide an electrical interface between a scene to be imaged, and a bolometer type sensor located, for example in a pixel, and wherein the efficiency of each pixel is improved by means of a thermal energy concentrator including a lens and an antenna. Where a plurality of pixels are located in an array, a microantenna is provided for each pixel in the array with a common lens being provided to focus and channel incoming radiation to each microantenna. Radiation from a scene is further coupled by means of a lens and microantenna to the absorbing element of each bolometer through an AC coupling circuit including an electronic chopper implemented by means of a PIN diode, the conductivity of which is varied so as to affect the reflection coefficient of the input signal supplied through the microantenna.

Further scope of applicability of the present invention will become apparent from the following detailed description provided hereinafter. It should be understood, however, that the detailed description and specific example, while indicating preferred embodiments of the invention, are provided by way of illustration only, since various changes and modifications coming within the spirit and scope of the invention will become apparent to those skilled in the art.

BRIEF DESCRIPTION OF THE DRAWINGS

The present invention will become more fully understood from the detailed description provided hereinafter in the accompanying drawings, which are provided by way of illustration only and thus are not meant to be considered in a limiting sense, and wherein.

DETAILED DESCRIPTION OF THE INVENTION

Figure 1:
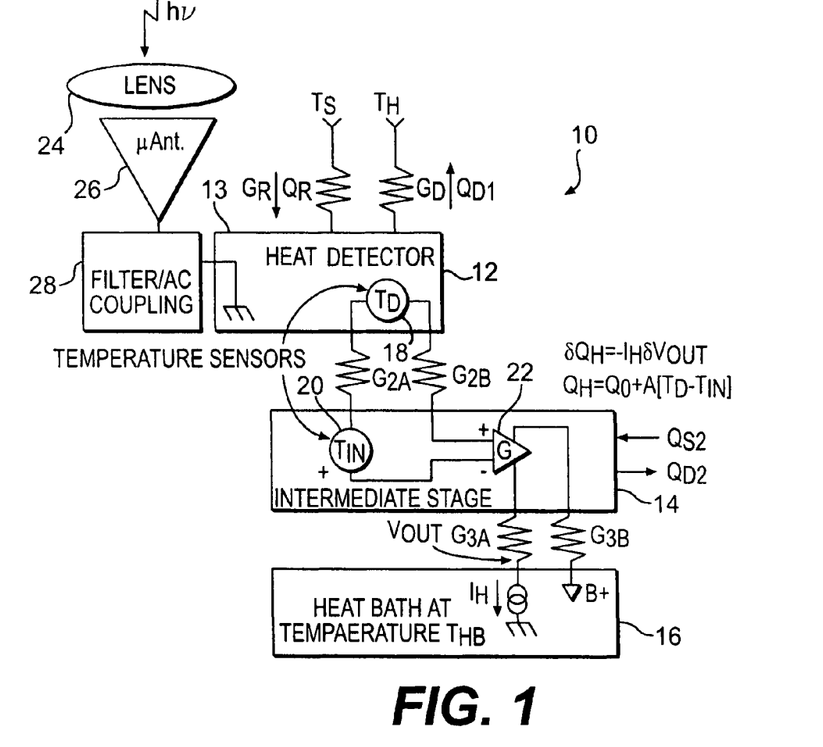
FIG. 1 is an electrical schematic diagram broadly illustrative of the inventive concept of the subject invention.

Referring now to the drawings wherein like reference numerals refer to like elements, reference is first made to FIG. 1. There, reference numeral 10 denotes an "ultra-sensitive" bolometer pixel including a detector stage 12, an intermediate stage 14, and a heat bath stage 16. Temperature sensors 18 and 20 are respectively located in the detector stage 12 and intermediate stage 14 and comprise silicon diodes connected in back-to-back relationship to an amplifier 22, also located in the intermediate stage 14. The amplifier generates heat in the intermediate stage 14 and electrothermal feedback zeroes the thermal difference between the heat detector stage and the intermediate stage.

Figure 4:
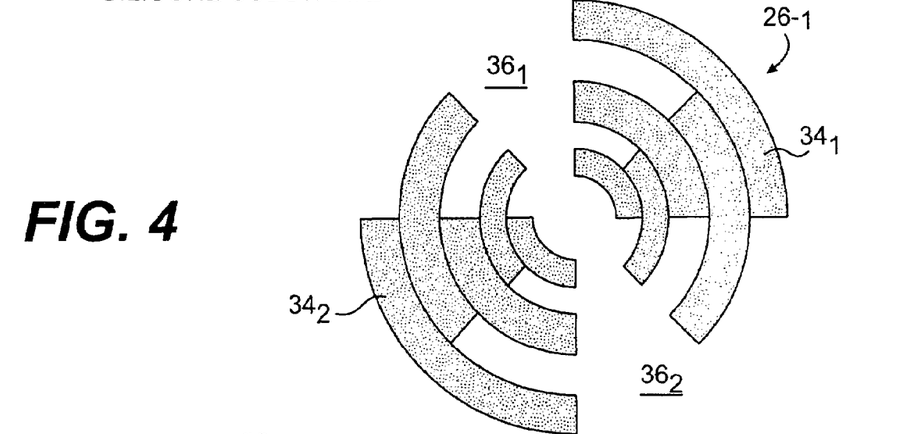
FIG. 4 is a top plan view of an embodiment of a toothed log period two-terminal self-complementary microantenna which can be used in connection with each bolometer pixel of an array of pixels in accordance with the subject invention.
Figure 5:
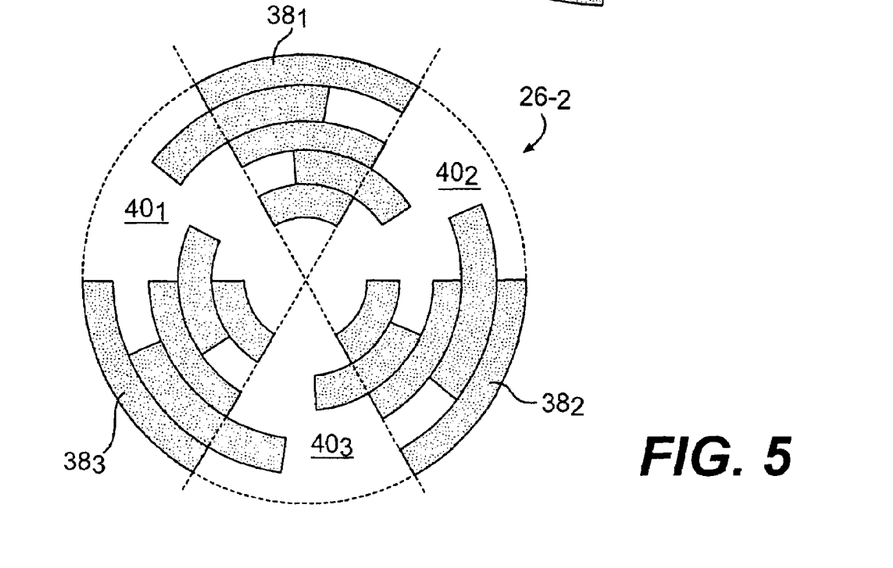
FIG. 5 is a top plan view of an embodiment of a toothed log periodic three-terminal complementary antenna which can be used in connection with a bolometer pixel in accordance wit the subject invention.

FIG. 1, representing a single pixel, shows inclusion of a lens 24 which is utilized to focus thermal radiation from an external scene on to an array of microantennas with 26 representing a single microantenna in said array, two examples of which are further depicted in FIGS. 4 and 5. The microantenna 26 operates to channel received radiation to the absorption element incorporated into and thermally in contact with the detector stage 12 by an AC filter and coupling circuit 28. The temperature rise in the detector stage 12 is read out by means of temperature sensor 18. A second temperature sensor 20 connected in a back-to-back circuit configuration with temperature sensor 18 and a voltage amplifier 22 via conductance elements $G_{2A}$ and $G_{2B}$. Electrical access to the voltage amplifier 22 from the heat bath stage 16 is by way of electrical wiring provided in conductances $G_{3A}$ and $G_{3B}$. Such an approach is directed to an "ultra-sensitive" silicon sensor such as shown in U.S. Pat. Nos. 7,157,708, and 6,489,615. However, a conventional bolometer without the intermediate stage can be used when desirable as shown, for example in related application Ser. No. 11/240,772.

Efficient impedance matching between the scene and the bolometer type sensing element 18 will maximize the signal received, i.e., a sensitivity. Accordingly, for thermal isolation, the microantenna 26 needs to be AC coupled to the absorbing element associated with the temperature sensor 18.

Considering now the impedance matching concept of the subject invention, black body optical radiation from the scene object travels through free space and is received and imaged with bolometer type apparatus. At present, the radiation of interest is LWIR, MM and THz spectral regions. The radiation's propagation path from the scene to a bolometer pixel, for example, may traverse several regions. For maximum sensitivity, impedance matching is therefore required between these regions to minimize reflections between regions so as to maximize the signal received within each bolometer pixel.

Figure 2:
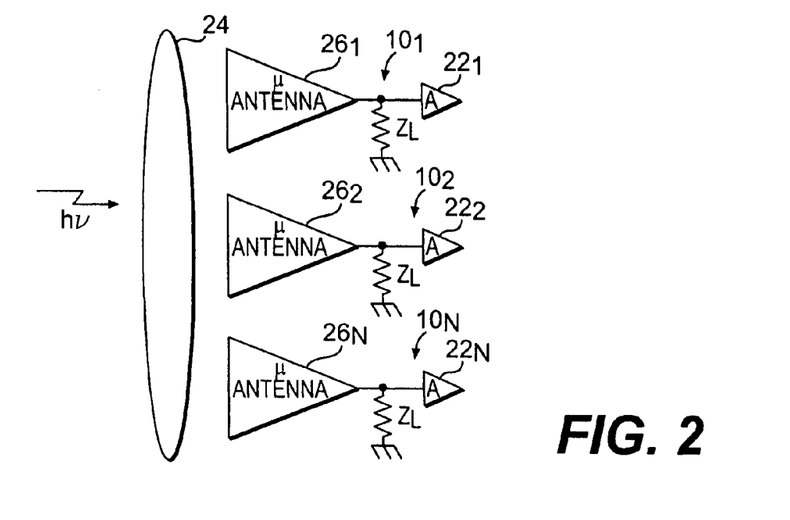
FIG. 2 is an electrical block diagram illustrative of three elements of a multi-element pixel array including a respective microantenna.
Figure 3:
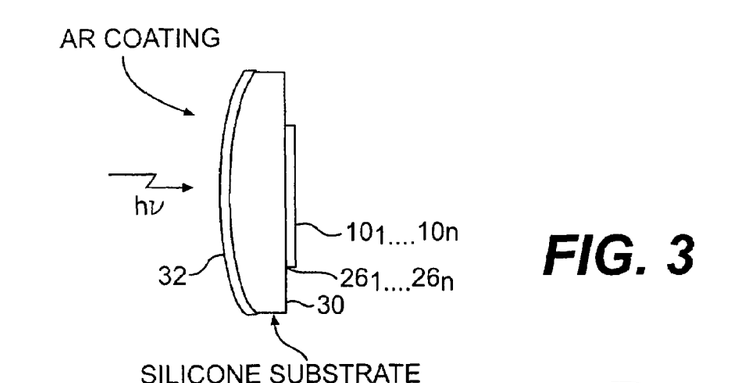
FIG. 3 is a longitudinal cross section of an array of bolometer pixels being illuminated from a scene through a silicon substrate.

Referring now to FIG. 2, shown thereat is a plurality of pixels $10_1$, $10_2$ ... $10_n$ of an array which receive radiation by incident upon the lens 24 which then focuses the radiation on respective microantennas $26_1$, $26_2$, ... $26_n$. The microantennas $26_1$ and $26_2$ ... $26_n$ are said to be front side illuminated from the antenna 24. The radiation incident on the microantennas $26_1$ ... $26_n$, however, can be backside illuminated through a substrate 30 comprised of, for example, silicon, having an anti-reflective (AR) coating 32 as shown in FIG. 3. At MM-THz, backside illumination as shown in FIG. 3 is preferable because pixel size is reduced by the index of refraction of the substrate. At LWIR, front side illumination is preferable since the pixel is sufficiently small and no further reductions are necessary.

Impedance matching is nevertheless needed at each of the segments that the radiation propagates from the scene to the detector. The impedance of each segment is matched to the next segment to minimize reflections and thereby maximize the amount of energy arriving at and is absorbed by each bolometer pixel. Whether front side or backside illumination is utilized, the first two propagation segments are the same, i.e., (1) free space and (2) the field imaging optics that focuses the radiation onto the array.

With respect to (1) free space, the emitted black body radiation from a scene travels through free space at the speed of light and through an impedance $[\mu_0/\epsilon_0]^{1/2}$, where $\mu_0$ and $\epsilon_0$ are the permeability and permeativity of free space, respectively. The velocity of light and free space is $3 \times 10^8$ m/sec. and the impedance of free space is $120\pi$ or approximately $377\Omega$.

With respect to the field imaging optics (2), to maximize signal, the imaging optics comprises a single element 34, e.g. a lens, as shown in FIG. 2 or one made from several lenses. The field of view (FOV) of one or a set of lenses is dictated by system requirements. Faster optics should provide best sensitivity because they maximize the scene signal arriving at the bolometer.

The scene radiation focused by the imaging optics, can be imaged onto a plurality of microantennas $26_1 \ldots 26_N$ through the front of the lens 24 (FIG. 2) or through the substrate 30 (FIG. 3). Imaging through the front side of the microantenna $26_i$ has different boundary conditions than imaging through the substrate 30. Imaging through a substrate 30, however, is relatively complicated and will now be considered.

Referring now to FIG. 3, where optical radiation is imaged on an array of bolometer pixels $10_1 \ldots 10_n$ via microantennas $26_i \ldots 26_n$ through the substrate 30, the first interface after the field optics, e.g. a lens, not shown, is the anti-reflective (AR) coating 32 on the back of the silicon substrate 30. The anti-reflective coating 32 minimizes reflection from the silicon substrate 30, and is equivalent to impedance matching between free space and the substrate. The AR layer 32 on the silicon substrate 30 is made to be one quarter of a wavelength $\lambda/4$ thick. The dielectric constant value of the AR coating 32 needs to be between the dielectric constant for air and silicon. The quarter wavelength of the AR coating 32 is the mean spectral band wavelength being imaged, for example, in the THz band or MM band. With the AR coating 32 on the back of the silicon substrate 30, minimum reflection occurs at the air/silicon substrate interface.

The silicon substrate 30 can be a rectangular slab or an array of microlenses, not shown. If the microlenses are used, one microlens is needed for each pixel. Backside illumination as shown in FIG. 3 reduces the pixel diffraction limit by the index of refraction. This is particularly useful at MM-wavelengths where the diffraction limit is large. Large diffraction limits have the disadvantage of requiring large optics and large focal planes, both of which are expensive. Backside illumination simplifies impedance matching between the silicon substrate 30 and the microantennas $26_1 \ldots 26_n$.

With respect to propagation of the hv energy inside the silicon substrate 30, the velocity and impedance will be reduced from free space values. The speed of light in silicon is $[\mu_S \epsilon_S]^{-1/2}$, where $\mu_S$ and $\epsilon_S$ are the permeability and permeativity of silicon, respectively. For silicon permeability $\mu_S \approx \mu_0$ and $\epsilon_S = 11.9\epsilon_0$, assuming very little absorption. The silicon substrate 30 must have high resistivity to minimize free electron absorption of MM and THz radiation. Minimizing the concentration of oxygen in the silicon substrate will also minimize absorption in the LWIR spectrum. Thus, inside the silicon, the velocity of optical radiation will be about 0.87 m/sec and the impedance will be substantially equal to 109.28Ω smaller than 377 ohms, the impedance of free space.

With respect to the configuration of the microantennas $26_1 \ldots 26_n$, passive imaging signal is maximized with microantennas having maximum frequency bandwidths. The widest bandwidth antennas are comprised of complementary designs. While there are several approaches to implementing the wideband complementary log periodic antennas with frequency independent input impedance, two possibilities include complementary toothed log period antennas as shown in FIGS. 4 and 5 and complementary spiral antennas, not shown. The toothed log periodic antenna shown, for example in FIG. 4, lends itself to impedance increases, whereas increasing the impedance of the complementary spiral antenna is relatively more difficult. Additionally, data exists on how to vary the beamwidth of toothed log periodic antennas. Accordingly, toothed log periodic antennas as shown in FIGS. 4 and 5 are preferred in the subject invention. FIG. 4 is an example of a toothed log periodic two-terminal self-complementary microantenna as identified by reference numeral 26-1 and is comprised of two complementary toothed metal regions $34_1$ and $34_2$ separated by equal open regions $36_1$ and $36_2$ which are rotated relative to one another by 90°. With respect to FIG. 5, it is illustrative of a complementary three-terminal antenna identified by reference numeral 26-2 and is comprised of three complementary toothed metal regions $38_1$, $38_2$ and $38_3$ separated by three equal open regions $40_1$, $40_2$ and $40_3$ separated by 60°.

Matching microantenna structures as shown in FIGS. 4 and 5 requires attention to their impedance and spectral bandwidths. Radiation from a scene propagating inside the silicon substrate 30, for example, as shown in FIG. 3, will reach the microantennas $26_1 \ldots 26_n$, with minimal reflections of the antenna impedance and matched to the impedance inside the silicon substrate 30.

The reflection coefficient $T(Z_A)$ is a function of a microantenna impedance $Z_A$ and can be expressed as:

$$\frac{P_{REF}(Z_A)}{P_{INC}} = \Gamma^2(Z_A) = \left[\frac{Z_{Si} - Z_A}{Z_{Si} + Z_A}\right]^2 \quad (1)$$

where $P_{REF}(Z_A)$ is the reflection coefficient as a function of the microantenna impedance and $P_{INC}$ is the power of the incident radiation inside the silicon substrate 30 (FIG. 3) in the MM, THz or IR spectral band. From Equation (1) it can be seen that the reflective power can be made zero by making the microantenna load impedance $Z_A$ equal to the impedance inside the silicon substrate 30, or $Z_{Si}$=109.28Ω. For maximum signal, microantenna $26_i$ would be broadband with an impedance of substantially 109.28Ω.

It can be shown that the impedance of an antenna with two planar complementary structures, including polarization effects, can be expressed as:

$$Z_S Z_C = [60\pi]^2/\epsilon_S \quad (2)$$

where, $Z_S$ and $Z_C$ are the impedance of the antenna and its complement. Furthermore, it can be shown that the impedance in free space of a two terminal self-complementary microantenna structure 26-1 as shown in FIG. 4 is broadband, frequency independent and equal to 60π. Embedding such a self-complementary micro-antenna in a dielectric medium reduces its impedance by $[\epsilon_S]^{1/2}$, which in silicon is 54.64Ω. This is twice the impedance of the silicon medium 30 shown in FIG. 3.

In the embodiment of an ultra-high sensitive silicon sensor (USSS) such as shown in FIG. 1, the microantennas $26_1 \ldots 26_n$ are not embedded in a single dielectric medium, but are located at the boundary between the silicon substrate and air. Accordingly, a modified expression for the self-complementary impedance applies and the impedance is reduced from the free space value approximated by the square root of the mean of the two dielectric constants which can be expressed as:

$$Z_S Z_C = [60\pi]^2/[0.5(\epsilon+1)] \quad (3)$$

Thus the impedance of the two terminal microantennas $26_1 \ldots 26_n$ formed at the silicon/air interface will have an impedance of 74.22Ω. This value does not match the impedance of the silicon substrate 30 which equals to 109.28Ω. This modification to the microantenna structure is needed to improve the matching between the 74.22Ω microantenna and the 109.28Ω silicon substrate impedance. The aforementioned impedance mismatch will produce a 3.6% reflection for radiation incident from the dielectric side (FIG. 3) and a 45% reflection for the radiation incident from the air interface (FIG. 2). Minimum reflection for radiation incident from the dielectric side and the inner impedance of the complementary microantennas $26_1 \ldots 26_n$ needs to be increased by a factor of 1.472 to match the impedance of silicon.

Increasing the impedance of the two terminal self-complementary antenna structure 26-1 as shown in FIG. 4 beyond the value specified by Equation (3) is possible if one resorts to increasing the number of terminals beyond the value computed for a two terminal complementary antenna structure. FIG. 5 provides such an example. There a three terminal structure is disclosed. It can be shown that the impedance for the three terminal microantenna structure 26-2 depicted in FIG. 5 would increase by 16.7% from 7422Ω to 86.6Ω. The impedance increase occurs only if one of the three complementary metal patterns, for example $38_1$ is left floating and the signals are obtained from the two remaining complementary metal patterns $38_2$ and $38_3$. If the two complementary metal patterns $38_2$ and $38_3$ are connected together to form a single terminal and the remaining complementary metal pattern $38_1$ is used as a second terminal, the impedance of the structure will be less than a two terminal complementary pattern shown in FIG. 4. Thus, for two terminal antennas, the terminating impedance would be in the order of 74.22Ω, while for the three terminal complementary antenna structure, the load impedance would be about 86.6Ω. With a three terminal structure 26-2 as shown in FIG. 5, the reflection coefficient for radiation from the substrate side (FIG. 3), decreases from 3.6% to 1.3%. Further improvement in impedance matching can be achieved if a four terminal structure is utilized. Accordingly, if a four terminal complementary antenna structure is formed, the impedance will increase by 41% over the two terminal complementary antenna structures shown in FIG. 4. Achieving a 41% increase in impedance occurs only if two opposite complementary structures are left floating and the remaining two opposite complementary structures are wired through the antenna load. Under such circumstances, a four terminal antenna impedance increases from 74.22Ω to 104.73Ω. The corresponding reflection coefficient for radiation incident from the substrate 30 (FIG. 3) decreases, from 3.6% to 0.045 T. The four terminal antenna, therefore, will need to be terminated with a 104.73Ω impedance if it is formed on a silicon substrate.

Given the small reduction in the reflection coefficient from 1.3% to 0.045%, by increasing the number of terminals from three to four, for cost effectiveness of the extra complications becomes a question. However, with four terminal structures, improved reception is expected for horizontally and vertically polarized radiation. The other alternative is to use a complementary spiral design with two terminals. This will increase the reflection by 3% and resolve the horizontally versus vertically polarization issues.

Extremely wide spectral bandwidth is achievable with the complementary logarithmic antenna approach. Experimental results have indicated that the bandwidth possible is about one decade about the center frequency, and the impedance remains constant over this wide bandwidth.

It should be noted that forming a microantenna $26_i$ at a dielectric boundary between a substrate and air, much of the radiation channels into the dielectric and very little into air. The radiative energy partition goes as $[\epsilon_s]^{3/2}$ and for a silicon substrate, 97% of the energy is received through the substrate and less than 3% through air.

With respect to impedance matching between the microantennas $26_1 \ldots 26_n$ and a detector stage 12 such as shown in FIG. 1, AC coupling of a respective microantenna $26_i$ to each pixel's detector stage is utilized to minimize thermal loading on the detector stage 12. AC coupling through the vacuum dielectric can be capacitive or inductive. For capacitive coupling, the separation between capacitor plates, or between the primary/secondary inductors for inductive coupling normally, should be greater than 1 μm. At LWIR frequencies, the large separation between capacitor plates provides sufficiently small reactance to make capacitive AC coupling viable. At lower frequencies, the capacitive reactance becomes much larger and thus would severely degrade the coupling efficiency. Inductive AC coupling does not suffer from this limitation and thus provides a solution for circumventing the need for large areas to realize sufficiently large coupling capacitances. This problem becomes particularly severe at mm wavelength frequencies (100 GHz).

$$C_L = \frac{1}{\omega^2 L_P}\left[\frac{Q_S^2+1}{(1-k^2)Q_S^2+1}\right] \quad (8)$$

Figure 6:
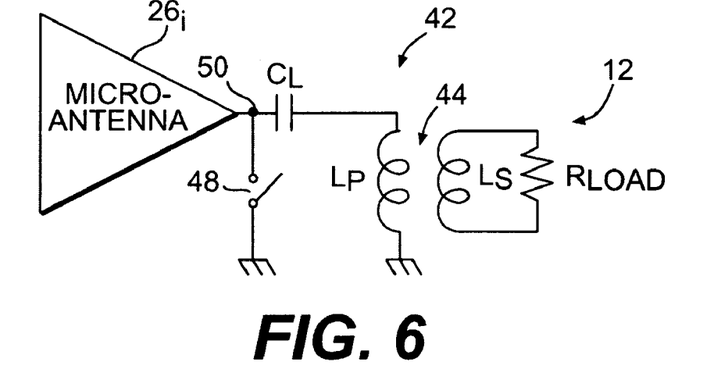
FIG. 6 is an electrical schematic diagram broadly illustrative of an AC coupling circuit for coupling the microantenna to a bolometer in accordance with the subject invention.

Referring now to FIG. 6, shown thereat is an electrical schematic diagram of an AC coupling circuit 42 from a microantenna $26_i$ to a detector stage 12 (FIG. 1) shown as a load $R_{LOAD}$. The coupling circuit 42 includes a transformer 44 having a primary winding $L_P$, and secondary winding $L_S$. A tuning capacitor CL is connected in series with the primary winding P so as to provide a tuning provision. Also an electrical switch 48 is connected from an antenna output node 50 to ground and operates as a shutter for decoupling the radiation from the microantenna $2_i$ to the detector stage 12. Capacitor $C_L$ is selected to insure resonance of the primary winding $L_P$ and selects the frequency band the microantenna $26_i$ will deliver to the load $R_L$ (detector stage 12). The secondary winding $L_S$ is made up of a small circular loop with a resistance such that when it is reflected through the transformer circuit, provides matched load for the microantenna impedance.

The secondary winding $L_S$ of the transformer 44 is located on and in thermal contact with a heat absorber element, not shown, for the temperature sensor 18 ($T_D$) in the detector stage 12 shown in FIG. 1. Inductive coupling provides good electrical coupling between the microantenna $26_i$ and the detector stage 12 while maintaining thermal isolation.

As noted, the switch 48 is included in the primary circuit $L_P$ of the transformer 44 so as to provide shuttering for radiation channeled from the microantenna to the detector stage, i.e., the load $R_{LOAD}$. Switch 42 shorts the antenna impedance to increase the reflection coefficient to 100%. A switch that would open the primary winding circuit to increase the impedance to a relatively large value would also operate as a shutter. However, it is easier to implement a shorting type impedance switch and thus is the preferable arrangement.

The inductive AC coupling circuit between a microantenna $26_i$ and the load $R_{LOAD}$ provided by the detector stage 12 of a sensor as shown in FIG. 1 can be analyzed using mesh equations for the primary and secondary circuits including the windings $L_P$ and $L_S$, respectively. Two mesh equations for the primary and secondary circuits can be written as:

$$E_S = Z_P I_P + j\omega M I_S \quad (4a)$$

$$0 = Z_S I_S + j\omega M I_P \quad (4b)$$

Figure 7:
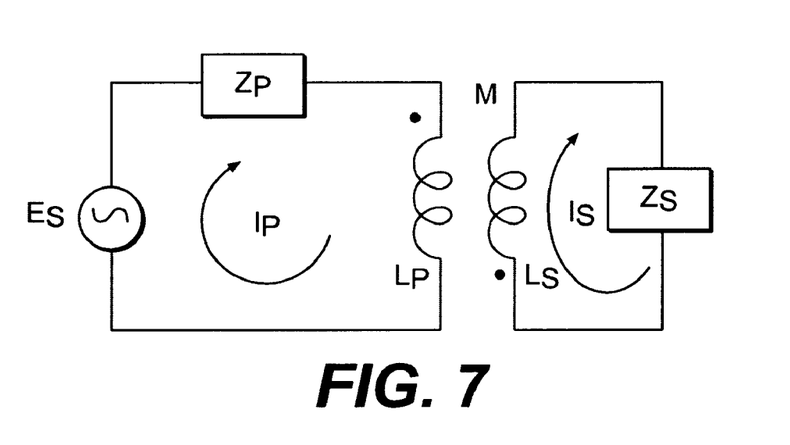
FIG. 7 is an electrical equivalent circuit of the circuitry shown in FIG. 6.

An equivalent circuit for Equations 4(a) and 4(b) is shown in FIG. 7. For brevity, the capacitance $C_L$ and the impedance of the antenna $26_i$ are included in the primary impedance $Z_P$, while the load impedance $R_{LOAD}$ of FIG. 6 is included in the secondary impedance $Z_S$. $E_S$ is the voltage signal of a microantenna. $I_P$ and $I_S$ are the respective currents and the primary and secondary windings $L_P$ and $L_S$ and M is the coupling coefficient between the primary loop and the secondary loop.

Equations 4(a) and 4(b) can be combined to form a single loop equation where the impedance in the secondary is transformed to the primary. By replacing $I_S$ in Equation 4(a) by using equation 4(b), it can be shown that $E_S$ can be expressed as:

$$E_S = \left[ Z_P + j\omega L_P + \frac{(\omega M)^2}{Z_S + j\omega L_S} \right] L_P \quad (5)$$

For the transformer secondary circuit impedance, $Z_P = R_{LOAD}$, and $M = k[L_P L_S]^{1/2}$, and the "Q" of the circuit is equal to $Q_s = \omega L_S / R_{LOAD}$. Removing the complex denominator in Equation (5) and making the above-stated substitutions, a more useful equation for Equation (5) results which can be expressed as:

$$\frac{E_S}{I_P} = Z_P + j\omega L_P \left[ \frac{(1-k^2)Q_S^2 + 1}{Q_S^2 + 1} \right] + \left[ \frac{k^2 Q_S^2}{Q_S^2 + 1} \right] \left[ \frac{L_P}{L_S} \right] R_{LOAD} \quad (6)$$

Maximum power will be delivered to the $R_{LOAD}$ from the microantenna $26_i$ if the load $R_{LOAD}$ presents a matched impedance through the transformer 44, and the reactance term in Equation (6) is cancelled by the reactance in $Z_P$. The impedance $Z_P$ is made up of the impedance of the microantenna $26_i$ in series with the coupling capacitor $C_L$. Equating the real terms in Equation (6) an expression for $R_{LOAD}$ results which is required to match the microantenna impedance and can be expressed as:

$$R_{LOAD} = \left[ \frac{Q_S^2 + 1}{k^2 Q_S^2} \right] \left[ \frac{L_S}{L_P} \right] R_{ANT} \quad (7)$$

Since $Q_s$ includes the value of $R_{LOAD}$, this value can be solved by a series of iterations. The value of $\omega$ is selected to correspond to the center operating frequency of the microantenna. First, the value of $R_{LOAD} = R_{ANT}$ is assumed. $Q_S$ is calculated using these values $L_P$ and k are computed, with the process repeated until Equation (7) is satisfied.

Equating the reactive terms, and expression for $C_L$ can be obtained and which can be expressed as:

$$C_L = \frac{1}{\omega^2 L_P} \left[ \frac{Q_S^2 + 1}{(1-k^2)Q_S^2 + 1} \right] \quad (8)$$

$Q_S$, $L_P$ and "k" have been calculated with Equation (7) when matching $R_{LOAD}$ to the microantenna. Using these values, $C_L$ can be solved so as to obtain the maximum matching power delivery by the microantenna to the sensor detector stage 12 shown in FIG. 1.

Figure 8:
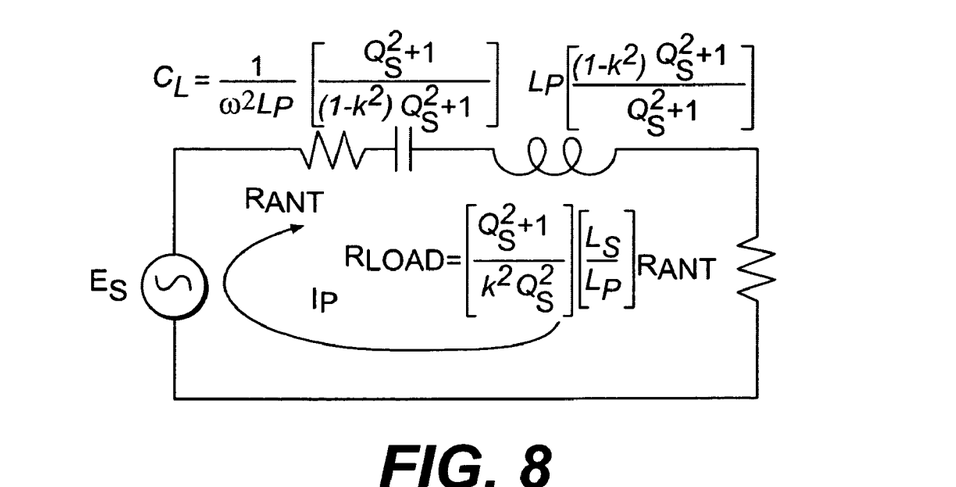
FIG. 8 is a single loop equivalent circuit for a transformer coupled microantenna to a detected stage in accordance with the subject invention.

The equivalent circuit with all the effective components resulting from a transformer is shown in FIG. 8 where $R_{ANT}$ is the impedance of a microantenna $26_i$.

In a preferred embodiment of the subject invention, the $Q_S$ value of the transformer secondary $L_S$ will vary between 0.2 to about 2.0 as the imaging frequency increases from 100 GHz to 1 THz where the transformer 44, shown in FIG. 6, is made up of a single loop primary winding $L_P$ and a single loop secondary winding $L_S$. The secondary winding $L_S$, moreover, is coaxial and coplanar with the primary winding $L_P$. The inductance of the secondary winding $L_P$ will be about 20 nH and the primary winding $L_P$ will be of a similar size. The primary winding $L_P$ will be formed from a highly conductive material such as gold or aluminum. The secondary winding $L_P$ will also be a single complete loop and made of resistive material, so as to serve a double function, i.e., an inductance and a resistance that serves as the load $R_{LOAD}$ for the microantenna $26_i$.

Figure 9:
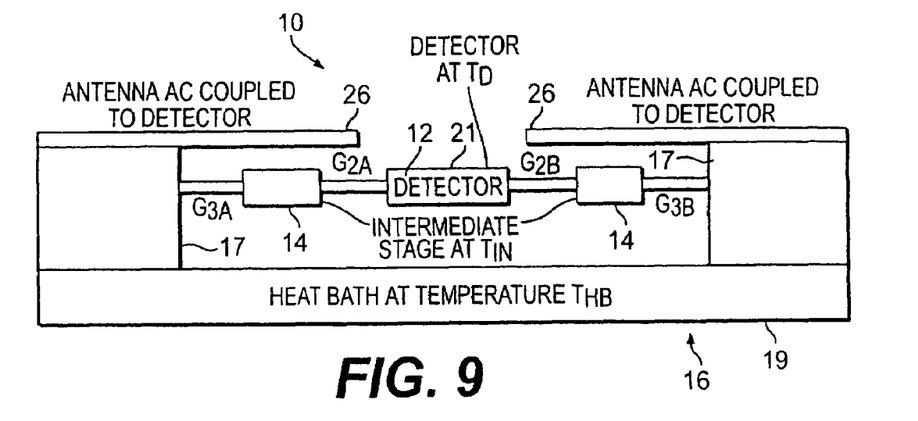
FIG. 9 is a longitudinal central cross sectional view of a pixel in accordance with the subject invention having three temperature stages including a detector stage, an intermediate stage, and a heat bath stage.

Referring now to FIG. 9, shown thereat is a cross section of a physical embodiment of an ultra-sensitive silicon sensor (USSS) pixel shown in FIG. 1. As shown in FIG. 9, the USSS pixel 10, as before, includes three temperature stages, namely the detector stage 12, the intermediate stage 14 and the heat bath stage 16. These three stages are isolated from one another by electrical and thermal links $G_{2A}$, $G_{2B}$, and $G_{3A}$, $G_{3B}$. A microantenna 26 comprising an annular element is shown located on an annular upper portion 17 of the heat bath stage 16, the lower portion 19 of which comprises a substrate. Although not shown, the primary winding $L_P$ of an inductive coupling transformer is also located on heat bath portion 17.

The energy received by the microantenna 26 is inductively coupled from the primary winding $L_P$ to the secondary winding $L_S$, located on the detector stage 12. The microantenna signal circulating in the secondary winding $L_S$ produces $I^2R$ heating that varies the temperature of the detector stage 12. The secondary winding LS comprises a resistive material deposited over the top surface 21 of the detector stage 12 over an oxide. The resistance of the secondary winding $L_S$ is adjusted to provide a matched load for the microantenna 26. The secondary winding can also be made from an N+ diffusion ring formed inside the body of the detector stage 16. The concentration of this N+ ring can be readily computed to satisfy for matching impedance with the microantenna primary coil. For example, if the required matching impedance is 100 ohm, then the N+ concentration of the ring can be appropriately adjusted. Specifically, if the detector stage ring is 8 μm in diameter is about 1.0 μm thick by 1.0 μm wide, or 23.5 squares. Hence, the detector stage ring needs an N+ implant dose with a resistance of about 4.7 ohms square or a resistivity of $4.7 \times 10^{-4+}$ ohms-cm. Such a resistivity is readily obtained by implanting the ring having a $4 \times 10^{19}$ doping concentration per cubic cm.

Mechanical choppers are known to be useful for removing 1/f frequency signal and calibration of DC offsets. The use of microantennas, however, preferably needs electronic choppers instead of mechanical choppers. Electronic choppers offer advantages over mechanical choppers and provide smaller size, better reliability, and very low weight. An electronic chopper can be used to change the resonance by changing capacitance value or it can be used to provide an electronic shunt to blank the microantenna output signal. Electronic choppers used in connection with the subject invention will now be described below.

Figure 10:
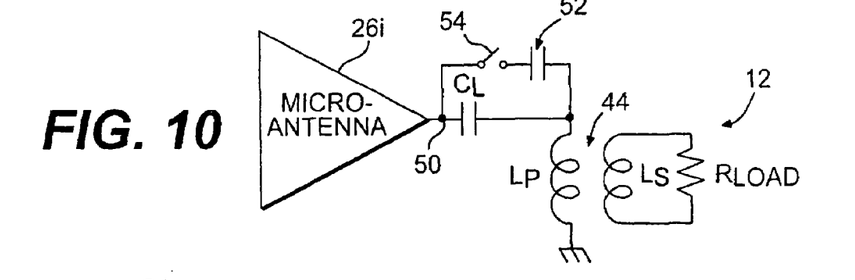
FIG. 10 is an electrical schematic diagram of an electronic chopper implemented by resonance switching coupled to a microantenna in accordance with the subject invention.

The switched resonance concept can readily be implemented, for example, by means of a switching capacitor such as shown in FIG. 10 that will change the resonance. In FIG. 10, by adding a capacitance 52 and a series connected electronic switch 54 is connected across the capacitance $C_L$. When the switch 54 is closed, the resonant frequency will decrease below the operating range of the microantenna 26. This has an effect of electronically chopping the received input signal by changing the resonance of the input circuit. The capacitance 52 can be implemented by means of a P/N junction that provides a voltage dependence capacitance. Changing the voltage dependent capacitance 52 will detune the resonance of the microantenna to detector coupling circuit shown. Thus the signal delivery from the microantenna $26_i$ to the detector stage 12 is significantly reduced. With the coupling efficiency between the microantenna and the detector stage reduced, electronic chopping of the signal is provided.

Figure 11:
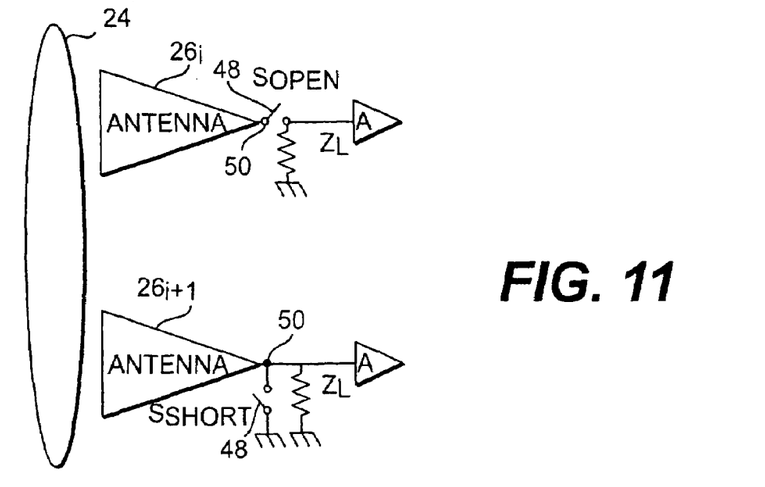
FIG. 11 is illustrative of an array wherein one bolometer pixel is shown with an open switch and another bolometer pixel is shown with a shorting switch.

Chopping of the electronic signal can also be accomplished by utilizing the dependency of the reflection coefficient between the microantenna $26_i$ and the AC coupled load $R_{LOAD}$ using an open or short switch 48 referred to above with respect to FIG. 6. In the present invention, the incident focal plane signals at MM, THz and IR frequencies span a range from about 90 GHz to 70 THz. Like all microwave circuits, the coupling efficiency between the microantenna $26_i$ and the load $R_{LOAD}$ depend on the microantenna impedance $Z_A$ and the load impedance $Z_L$. For relatively high coupling efficiency, a zero reflection coefficient $\Gamma(Z_L)$ is desired. The reflection coefficient is a function of the load impedance $Z_L$ and is given by Equation (1) where $P_{REF}(Z_A)$ is the reflection coefficient as a function of the microantenna load impedance and $P_{INC}$ is the power of the incident radiation in the MM, THz, or IR spectral band. It can be shown that the reflected power can be made 100% by making the microantenna load impedance $Z_L$ equal to zero or infinity, i.e., $\Gamma(Z_L=0)=1$, or $\Gamma(Z_L=\infty)$. Such changes in the microantenna load impedance have the same effect as placing a mechanical chopper in front of the power incident on the array and where all of it would be reflected. An electronic switch 48 appropriately incorporated with each microantenna load, for example, by a series connection or a shunt can provide means for switching the load impedance to zero, or infinity, as shown by FIG. 11.

In a bolometer array (FIG. 2), all the loads $Z_L$ would be either shorted or opened. However, to illustrate both approaches to electronic choppers, reference is made to FIG. 11 where one example of a pixel with a microantenna $26_i$ that has an infinite load electronically switched $S_{OPEN}$, and one example with the microantenna $26_{i+1}$ with a zero load electronically switched ($S_{SHORT}$). In principle, both approaches will work; however, pixel design details will favor one approach over the other.

Obtaining an electronic switch 48 that provides excellent isolation (infinite impedance) or a short (zero impedance) is very difficult. Capacitive parasitic coupling makes infinite switches very difficult. Similarly, realizing a short requires a large amount of current and this is not compatible with a low power imager with many elements. However, such switches can be obtained with MEM devices. Given the state of development of MEM technology, a simpler approach is nevertheless needed.

Figure 12:
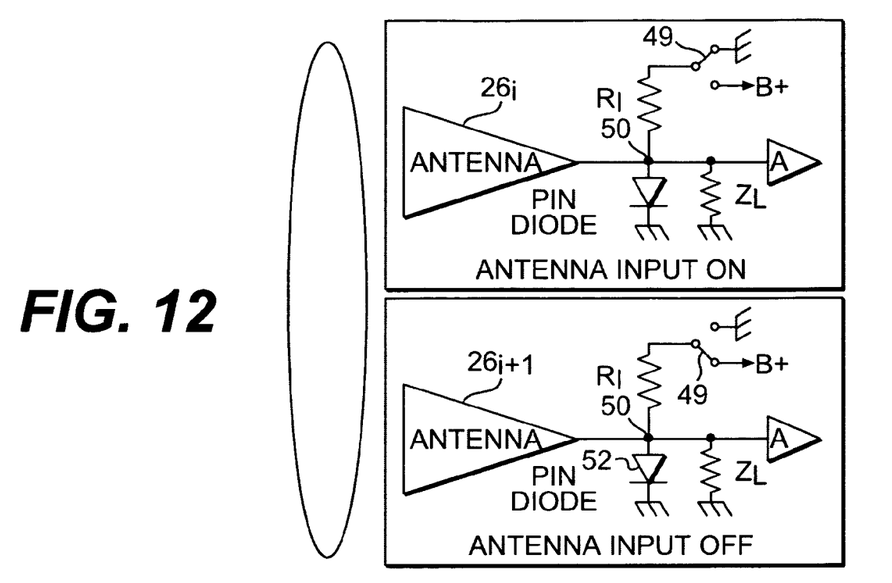
FIG. 12 is an electrical schematic diagram of a bolometer pixel wherein the antenna input is in an ON state by operation of a PIN diode, while another pixel is in an OFF state by the operation of a PIN diode.

Switching microantennas 26 ON and OFF that operate between 100 GHz and 30 THz is a challenging task. Fortunately, the difficulty of this challenge is greatly mitigated by the fact that the ON and OFF switching need not occur very fast, e.g., at about several kilohertz. This mitigation means that three terminal devices that operate at THz frequencies are not needed, something that is not possible with current technology. The device needed, however, is one that has an impedance that can be electronically controlled between two values. One of these values is significantly above the characteristic impedance of the antenna $Z_A$ and the other impedance value is significantly below the characteristic impedance of the microantenna. For best performance (impedance matching), the antenna's characteristic impedance is made equal to the load impedance, i.e., $Z_L=Z_A$. In FIG. 12, such a device is disclosed and it comprises a PIN diode shown by reference numeral 52 electronically controlled by a current supplied from a B+ supply source through a large resistor $R_I$. The parallel combination of the PIN diode 52 and the resistor $R_I$ provides an electronically controlled impedance on the microantenna $26_i$ and the load $Z_L$. Electronically changing the PIN diode impedance will accordingly affect the reflection coefficient $\Gamma(Z_L)$ of the signal supplied through the microantenna $26_i$. By appropriately changing the value of the PIN diode impedance, the reflection coefficient $\Gamma(Z_L)$ can be electronically modulated between substantially zero and one, thereby providing an electronic chopper. The performance and characteristics of such an electronic chopper with appropriate impedance values will now be described.

Figure 13A:
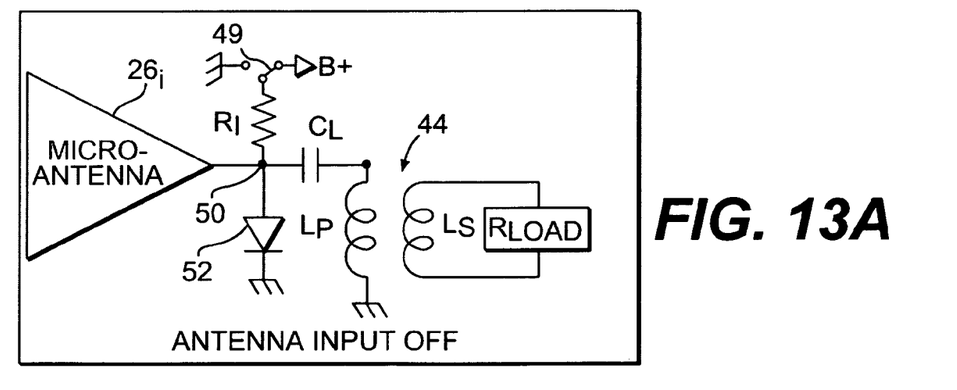
FIG. 13A is an electrical schematic diagram of the pixel shown in FIG. 12, with the antenna input in an OFF state and inductively coupled to a load.
Figure 13B:
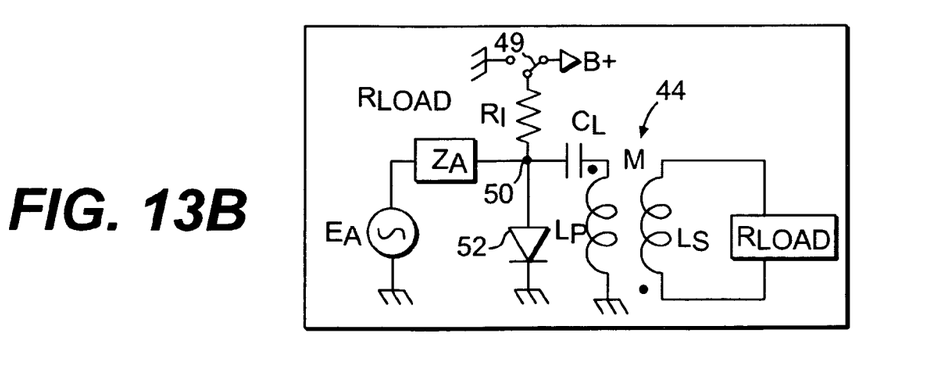
FIG. 13B is an electrical equivalent circuit of the circuitry shown in FIG. 13A.
Figure 14A:
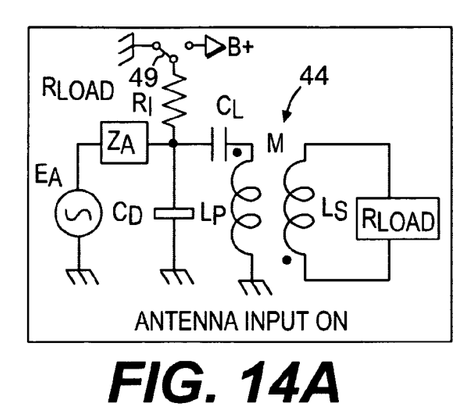
FIG. 14A is an equivalent circuit of the circuitry shown in FIG. 13A, with the antenna input in an ON state.
Figure 14B:
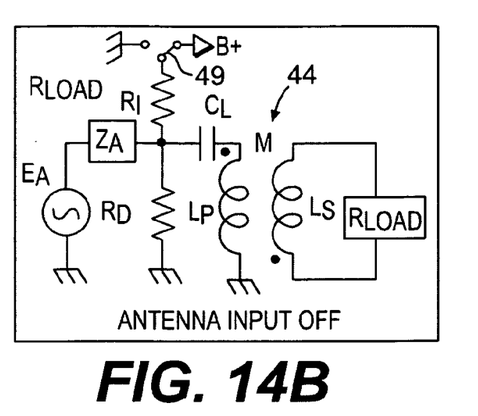
FIG. 14B is an equivalent circuit of the circuitry shown in FIGS. 13A with the antenna input in an OFF state.

Referring now to FIGS. 13-15, microantenna $26_i$ is shown in FIG. 13A inductively coupled to a load $Z_L$ by means of the transformer 44. The operation of the PIN diode 52 illustrated in equivalent circuit of FIG. 13A is shown in FIG. 13B where there is included the antenna impedance $Z_A$ and the series inductance of the primary winding $L_P$ of the transformer 44 and the secondary winding $L_S$ coupled to the load impedance $Z_L$. The series capacitance $C_L$ in the primary winding circuit is used to resonate it at a selected operating frequency; for example, 100 GHz or 30 THz. The PIN diode's electronically controlled impedance (capacitive reactance) is used for switching the microantenna $26_i$ ON and OFF by means of resistance $R_1$ alternately coupled to a $B^+$ supply voltage and ground by means of the switch 49. This is illustrated in FIGS. 14A and 14B, respectively.

Accordingly, when a current of about 2.5 mA, for example, is passed through the PIN diode 52, the diode can be replaced by a 10Ω resistor $R_D$ as shown in FIG. 14B. The 10Ω impedance $R_D$ is much smaller (10×) than the antenna impedance $Z_A$ or the load impedance $(Z_L)$. This results in the signal of the microantenna $26_i$ (FIG. 13A) being turned Off by being shunted to ground through the 10 ohms impedance of $R_D$. When the PIN diode 52 has no DC current flowing through it, i.e., where the switch 49 connects $R_1$ to ground, the PIN diode's impedance as shown in FIG. 14A can be represented as a capacitor $C_D$ in series with the current bias resistor $R_I$. The size of the PIN diode's capacitance $C_D$ and the resistor $R_I \approx 10$ k ohms need to be adjusted so they do not drain any significant signal flowing between the microantenna $26_i$ and the inductively coupled load $Z_L$. Because the PIN diode 52 is unbiased and the signal from the antenna $26_i$ is very small, the resistance of the PIN diode 52 will be much larger than $R_I$. Satisfying these conditions with the PIN diode 52 requires examining the required characteristics in the OFF and ON state of the microantenna $26_i$. These are addressed in FIGS. 15A and 15B.

Figure 15A:
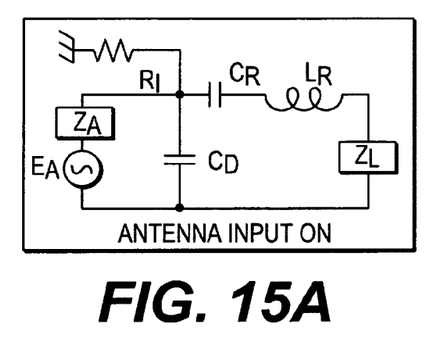
FIGS. 15A and 15B are illustrative of antenna electronic chopper equivalent circuits for the ON and OFF states of the antenna input.

In the ON state as shown in FIGS. 12 and 14A, the PIN diode 52 is in the turned OFF state. The antenna impedance $Z_a$ will be 110 ohms at 100 GHz and 377 ohms at 30 THz. The impedance of the load $Z_L$ will be about 110 ohms. The values of $C_R$ and $L_R$ will be adjusted to series resonate at $E_A$=100 GHz or 30 THz. Thus, the microantenna $26_i$ will be loaded by the parallel combination of $R_I$, $C_D$ and $Z_L$ as shown in FIG. 15A. By design, $R_I$ is about 5K ohms, making it negligible relative to $Z_L$. The PIN diode's shunting capacitor $C_D$ needs to be very small to minimize shunting the $E_A$ signals, between 100 GHz to 30 THz, from the antenna $26_i$ to ground. The best that can be expected is about 70% of the 30 THz signal will be applied to the load $Z_L$, and almost 100% of the 100 GHz signal will be applied to the load. Achieving these performance characteristics requires making the PIN diode's shunting reactance ($1/\omega C_P$) much larger than 110 ohms load impedance $Z_L$. At 100 GHz in the antenna ON state, the PIN diode capacitance needs to be smaller than:

$$C_D << 1 \lfloor 2\pi 10^{11} 110 \rfloor \quad (9)$$

Figure 16:
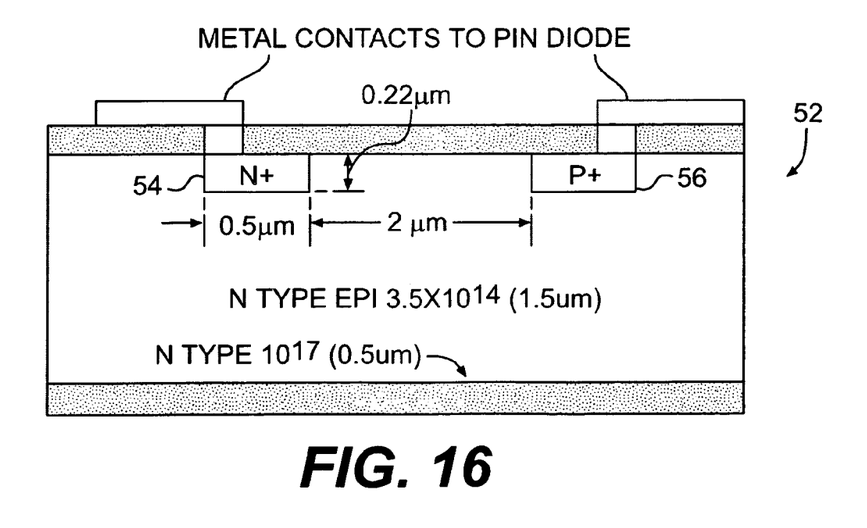
FIG. 16 is illustrative of a central longitudinal cross section of a PIN diode type load capacitance.

Evaluating Equation (9), it indicates that the capacitor $C_D$ needs to be smaller than 14 fF ($10^9$ farads). This is not very difficult to achieve in integrated circuits. However, at 30 THz, the capacitance $C_D$ needs to be even smaller than 14 fF. Specifically, at 30 THz, the capacitance needs to be smaller than:

$$C_D << 1/\lfloor 2\pi 30 \times 10^{12} 110 \rfloor \quad (10)$$

or less than 48 aF ($10^9$ farads). Such a small capacitance is relatively more difficult to achieve and requires special attention to the structure of the PIN diode 52 as shown in FIG. 16. There the PIN diode's capacitance is made small by using a lateral instead of a vertical geometry. The N+ and P+ regions 54 and 56 are made very shallow and small. For example, the N+ and P+ regions 54 and 56 are only 0.2 μm deep and 0.5 μm wide edge facing one another. The capacitance of such a geometry is about 5 aF. This small value, of about 5 aF for capacitor $C_D$ of the PIN diode 52 does not include parasitics and care will be needed to minimize such effects. The 5 aF calculated value for $C_D$ is sufficiently smaller than the 48 aF calculated with Equation (10).

In the OFF mode of the PIN diode 52, it is represented as a capacitor $C_D$ as shown in FIGS. 14A and 15A. This representation is valid for two reasons. First, the signal $E_A$ from the microantenna $26_i$ is too small to forward or reverse bias the PIN junction. Thus, the PIN diode's resistance at zero bias is very large and the impedance at high frequency is limited to the junction capacitance. Second, the PIN diode "I" region will be depleted from the p/n built-in voltage. With a concentration of about $3.5 \times 10^{14}$ cm$^{-3}$, the built-in potential will produce about a two-micron depletion region. In FIG. 16, the lateral spacing between the P+ and N+ regions is about 2 μm. The area between the N+ and P+ regions will be depleted because of the built-in potential.

Figure 15B:
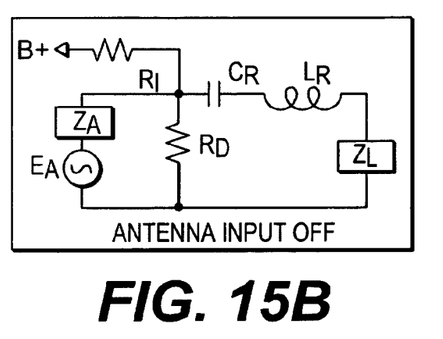

In the antenna OFF state as shown in FIGS. 14B and 15B, the PIN diode 52 is turned ON. The PIN diode is turned ON by applying a forward current through the PIN diode of about 2.5 mA. The current is produced by applying a 10 volts B+ potential to the $R_I$ resistor through the switch 49. The PIN diodes forward impedance at the 2.5 mA bias is about 10 ohms and this is much less than the antenna impedance $Z_a$=110 ohms at 100 GHz and 377 ohms at 30 THz or 110 ohms load $Z_L$. The 10 ohms shunting resistor $R_D$ will severely attenuate the signal from the antenna $26_i$. The anticipated attenuation will be 99%.

The noise from the PIN diode is largest when the PIN diode 52 is in the ON state. IN the OFF state, the noise is negligible relative to the Black Body radiation levels. In the ON state, 2.5 mA bias current $I_D$ is passed through the PIN diode 52. The current's power spectral density of the current shot noise is simply $2qI_D$. The noise delivered to the 110 ohms load $Z_L$ can be expressed as:

$$[2qI_D \Delta f]\left[\frac{kT}{qI_D}\right]\left[\frac{\frac{kT}{QI_D}}{110 + \frac{kT}{qI_D}}\right]^2 = 2kT\Delta f\left[\frac{1}{12}\right]^2 \quad (11)$$

In Equation (11), the noise is expressed as a product of three terms. The first term is the noise current amplitude squared times the bandwidth $\Delta f$. The second factor is the PIN diode resistance in the ON stage. The third term reflects the noise current division between the load and the PIN diode impedance. The PIN diode's impedance in the ON state is about 10 ohms. When all these factors are combined, only a small portion of the PIN noise reaches the load. The 100 GHz signal power is about $kT\Delta f$, and this is about 72 times larger than the noise. If more noise attenuation is desired, it can be accomplished by increasing the PIN bias current $I_D$. Doubling the value of $I_D$ to 5 mA from 2.5 mA will attenuate the shot noise by 264 times instead of 72 times. It is evident that an electronic chopper made from a PIN diode 52 is an effective low noise device for turning ON and OFF the antenna input signal $E_a$ to the load $Z_L$.

Thus what is disclosed is an electronic chopper using a PIN diode. It exhibits low noise and should operate for turning ON and OFF input signals from 100 GHz to 30 THz. This makes it particularly useful for bolometers when calibrating and removing 1/f noise contributions. The power required for this type of chopper, moreover, is very small, about 50 mW. Since it would operate sequentially, and not in parallel, on all the detectors in a focal plane array, the added power load on a focal plane from the electronic chopper is very small, i.e., in the order of 50 mW.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An electromagnetic radiation sensor assembly, comprising:
   at least one bolometer type sensor located in a detector sub-assembly and including a thermally responsive sensing element co-located with and in thermal contact with a thermal absorber element;
   a sub-assembly including an antenna for receiving incident radiant energy from a remote source of electromagnetic radiation;
   one or more elements for maximizing the energy coupling between the remote source of electromagnetic energy and the thermal absorber element;
   an AC coupling circuit comprising an inductive coupling circuit for providing electrical coupling and thermal isolation of the radiant energy from the antenna element to the thermal absorber element;
   wherein the thermally responsive sensing element senses the temperature change in the absorber element; and
   readout circuitry for providing an output signal of the temperature sensed by said sensing element.

2. A radiation sensor assembly in accordance with claim 1 wherein said AC coupling circuit additionally includes circuit means for tuning the coupling circuit to a predetermined frequency band.

3. A radiation sensor assembly in accordance with claim 1 wherein said inductive coupling circuit includes a transformer having a primary winding coupled to the antenna and a secondary winding coupled to the thermal absorber element.

4. A radiation sensor assembly in accordance with claim 3 and additionally including circuit means for providing an impedance match between the antenna and the thermal absorber element.

5. A radiation sensor assembly in accordance with claim 3 and additionally including circuit means connected to the primary winding of the transformer for tuning the AC coupling circuit to a predetermined frequency band.

6. A radiation sensor assembly in accordance with claim 5 wherein said circuit means for tuning the AC coupling circuit comprises capacitance circuit means.

7. A radiation sensor assembly in accordance with claim 6 wherein said capacitance circuit means includes capacitance circuit means connected between the antenna and the primary winding of the transformer.

8. A radiation sensor assembly in accordance with claim 7 wherein said capacitance circuit means comprises at least one tuning capacitor connected in series with the primary winding of the transformer.

9. A radiation sensor assembly in accordance with claim 8 and additionally including a switched capacitance circuit coupled across the tuning capacitor for detecting the AC coupling and thereby provide a chopper type shutter by resonance switching.

10. A radiation sensor assembly in accordance with claim 9 wherein the switched capacitance circuit includes a capacitance element connected in series with an electrical switch.

11. A radiation sensor assembly in accordance with claim 10 wherein the switch comprises a semiconductor switch.

12. A radiation sensor assembly in accordance with claim 11 wherein the semiconductor diode comprises a PIN diode.

13. A radiation sensor assembly in accordance with claim 1 and additionally including circuit means providing a shutter for interrupting the radiant energy from the antenna to the thermal absorber element.

14. A radiation sensor assembly in accordance with claim 13 wherein the shutter comprises a switch.

15. A radiation sensor assembly in accordance with claim 13 wherein the circuit means providing a shutter comprises an electronic shutter located between the antenna and the thermal absorber element.

16. A radiation sensor assembly in accordance with claim 13 wherein said circuit for providing electrical coupling includes a transformer having a primary winding coupled to the antenna and a secondary winding coupled to the thermal absorber element and wherein the shutter is connected from a circuit node between the antenna and primary winding and ground.

17. A radiation sensor assembly in accordance with claim 16 wherein said shutter means comprises switch means.

18. A radiation sensor assembly in accordance with claim 16 wherein said shutter means comprises a semiconductor diode.

19. A radiation sensor assembly in accordance with claim 18 wherein the semiconductor diode comprises a PIN diode.

20. A radiation sensor assembly in accordance with claim 13 wherein said circuit for providing electrical coupling includes a transformer having a primary winding coupled to the antenna and a secondary winding coupled to the thermal absorber element and wherein the shutter is coupled in series with the primary winding.

21. A radiation sensor assembly in accordance with claim 20 wherein said shutter means comprises switch means.

22. A radiation sensor assembly in accordance with claim 20 wherein said shutter means comprises a semiconductor diode.

23. A radiation sensor assembly in accordance with claim 22 wherein the semiconductor diode comprises a PIN diode.

24. A radiation sensor assembly in accordance with claim 1 wherein said antenna comprises a multi-terminal, self-complementary antenna structure.

25. A radiation sensor assembly in accordance with claim 24 wherein said antenna comprises a toothed log periodic multi-terminal, self-complementary antenna structure.

26. A radiation sensor assembly in accordance with claim 25 wherein said antenna comprises a two terminal antenna structure.

27. A radiation sensor assembly in accordance with claim 25 wherein said antenna comprises a three terminal antenna structure.

28. A radiation sensor assembly in accordance with claim 1 wherein said one or more elements for maximizing energy includes a lens structure in relatively close proximity to said antenna for focusing incident energy from said source onto the antenna.

29. A radiation sensor assembly in accordance with claim 28 wherein the lens structure includes a substrate affixed thereto and having an anti-reflective coating on one surface.

30. A radiation sensor assembly in accordance with claim 29 wherein the substrate is comprised of semiconductor material.

31. A radiation sensor assembly in accordance with claim 29 wherein the substrate is comprised of silicon.

32. A radiation sensor assembly in accordance with claim 1 wherein the detector sub-assembly is located in the detector stage of a three stage sensor pixel including a detector stage, an intermediate stage, and a heat bath stage, and
wherein the readout circuitry is located in the intermediate stage.

33. A radiation sensor assembly in accordance with claim 32 wherein the sub-assembly including an antenna is located on the heat bath stage.

34. A radiation sensor assembly in accordance with claim 1 wherein the detector sub-assembly is located in the detector stage of a two stage sensor pixel including a detector stage and a heat bath stage, and
wherein the readout circuitry is located in the heat bath stage.

35. A radiation sensor assembly in accordance with claim 1 wherein said at least one bolometer type sensor comprises a plurality of sensors located in respective detector sub-assemblies.

36. A radiation sensor assembly in accordance with claim 35 wherein said plurality of sensors are arranged in an array.

37. A radiation sensor assembly in accordance with claim 36 wherein each of said plurality of sensors include a separate antenna.

38. A radiation sensor assembly in accordance with claim 37 wherein the separate antenna comprises microantennas including multi-terminal, self-complementary antenna structures.

* * * * *